United States Patent Office 2,913,400
Patented Nov. 17, 1959

2,913,400

CHEMICAL CONVERSION PROCESSES USING A SPECIALLY PREPARED MOLYBDENUM OXIDE CATALYST

William P. Burton, Little Silver, Philip A. Lefrancois, Cranford, and Earl W. Riblett, Tenafly, N.J., assignors to The M. W. Kellogg Company, Jersey City, N.J., a corporation of Delaware No Drawing. Application January 15, 1957
Serial No. 634,178

17 Claims. (Cl. 208—136)

This invention relates to a novel molybdenum oxide catalyst and the method of preparing same, and more particularly pertains to a novel molybdenum oxide on alumina catalyst and the method of making same, which catalyst is particularly adapted for hydrocarbon conversion reactions. This application is a continuation-in-part of application Serial No. 301,398, filed July 28, 1952, and now abandoned.

An object of this invention is to provide a novel molybdenum oxide catalyst.

Another object of the present invention is to provide a novel method for preparing molybdenum oxide catalyst.

Still another object of this invention is to provide a novel molybdenum oxide on alumina catalyst.

A further object of this invention is to provide a novel method of preparing molybdenum oxide on alumina catalyst which is particularly useful for hydrocarbon conversion reactions.

Other objects and advantages will become apparent from the following description and explanation thereof.

The present invention contemplates a molybdenum oxide catalyst having present therein alumina which is prepared by reacting an aluminum salt with an alkaline reagent to form alumina gel, drying the alumina gel, reslurrying the dried gel and treating the reslurried alumina gel with an alkaline reagent for a period sufficient to convert the same to a gelatinous precipitate which is a highly active form of alumina for use in a molybdenum oxide catalyst. More particularly, the alumina gel is prepared by reacting an aluminum salt of a strong acid with an alkaline reagent.

The aluminum salt which is employed in the preparation of the gel is any organic or inorganic salt which is capable of reacting with an alkaline reagent to form the desired gel material. In this regard, excellent types of gels are obtained by reacting an aluminum salt of a strong acid, particularly of a strong inorganic acid, with an alkaline reagent. Specific examples of aluminum salts which can be used in the preparation of the gel are aluminum chloride, aluminum sulfate, aluminum nitrate, etc. The alkaline reagent which is employed in the reaction with the aluminum salt is any material which is capable of reacting therewith to produce the gel. For example, the alkaline reagent can be ammonia, substituted ammonium compounds, e.g., the quaternary ammonium hydroxides, etc.; the alkali and alkaline earth metal hydroxides; etc. Ordinarily, it is preferred to employ ammonia in the form of ammonium hydroxide or a quaternary ammonium hydroxide as an alkaline reagent, because there is little or no danger of introducing foreign ions into the catalyst material. When the presence of ions or metals other than aluminum and molybdenum are not harmful, then it is intended to employ a strong alkaline material such as an alkali or alkaline earth metal hydroxide. The quaternary ammonium hydroxides include the alkyl substituted types, tetramethyl ammonium hydroxide, tetraethyl ammonium hydroxide, etc. The quaternary ammonium compounds are strongly alkaline materials and serve adequately for reacting readily with the aluminum salt to form the alumina gel.

The quantity of alkaline reagent which is generally used for reacting with the aluminum salt depends upon the pH desired. Generally, the formation of alumina gel starts at a pH of about 3 and the formation of the gel is substantially complete at a pH of about 4 to 5. However, in order to insure complete reaction of the aluminum salt to form the alumina gel, the ultimate pH of the reaction solution is about 6.5 to about 7.5, or preferably about 7. Hence the addition of alkaline reagent can be controlled by obtaining a pH of at least about 3 and it can be as high as is practical or desirable. There is no limit at which the pH of the solution should be maintained in preparing the alumina gel. The temperature at which the gel is produced can be at atmospheric or ambient temperatures. Generally, the temperature of gel formation is about 50° to about 170° F., preferably about 60° to about 120° F. An exothermic effect is experienced during the production of the gel, however, this temperature is not excessive and thus it would not require any cooling unless it is desired to maintain the temperature at a level lower than the equilibrium state. Normally, the alkaline reagent is added to the aluminum salt in the preparation of the gel. This addition can take place in a gradual manner or the required amount of alkaline reagent to obtain a desired pH can be added in a single operation. The addition of the alkaline reagent to the salt is preferred, because the gel thus produced is generally homogeneous. On the other hand, the reverse order of addition can be used; however, care should be taken to distribute adequately the aluminum salt throughout the alkaline medium otherwise a less homogeneous gel is produced. For the purpose of this specification and the appended claims, the expression "alumina gel" is intended to designate a system possessing the properties (a) of being a coherent, colloid disperse system of alumina and water, (b) of exhibiting mechanical properties characteristic of the solid state, and (c) of both the dispersed component, which is alumina, and the dispersion medium, which is water, extending themselves completely throughout the whole system.

The gel which is produced by reacting the aluminum salt with the alkaline reagent is then dried and reslurried in water to reconstitute the gel. The reconstituted gel is then treated further with the alkaline reagent for a period of time sufficient to convert the gel to a gelatinous precipitate. The effect of drying and reconstituting the alumina gel is not fully understood, but it is known that the reconstituted gel is considerably more acid than the original gel, probably due to volatilization of ammonia. It is believed that the aging under more acid conditions which takes place during the drying step changes the form of the alumina. For the purpose of this specification and appended claims, the "gelatinous precipitate" is obtained when the alumina in the gel behaves like a precipitate, and the alumina which is gelatinous in character settles from solution leaving a clear supernatant liquid, which is water. The phenomenon of treating the reslurried gel with an alkaline reagent for a period sufficient to convert the same to a gelatinous precipitate is not clearly understood. However, it was found that a superior type of molybdenum catalyst on such an alumina is realized. The alkaline reagent employed for the purpose of converting the gel to the gelatinous precipitate can be any one or more of those which have been previously described in connection with the process of converting the aluminum salt to an alumina gel. The period of time required for the conversion to gelatinous precipitate and the quantity of alkaline reagent which is necessary can vary considerably depending upon the pH at which the alumina gel is permitted to stand as well as upon the type of aluminum salt which is used in the preparation of the alumina gel. Generally, it is desirable to wash the alumina gel for the removal of any foreign ions which are present by reason of the reactants employed in the preparation thereof. In this connection, the wash procedure involves the employment of an alkaline solution, e.g., ammoniated water. The washing operation accomplishes the twofold purpose of removing foreign materials or ions from the gel and assists in the conversion of the gel to a gelatinous precipitate. Successive washings with ammoniated water or alkaline solution will increase the pH of the gel and by virtue of the time consumed in this operation, it is possible to obtain a washed gelatinous precipitate. The temperature at which the alumina gel is converted to a gelatinous precipitate can also serve as a method of controlling the rate of conversion. To some extent, high temperatures aid in the conversion of the gel to the gelatinous precipitate, and generally, these temperatures run from about 100° to about 200° F., preferably about 120° to about 170° F. The use of elevated temperatures under some conditions are not preferred, because there is a tendency to reduce the quantity of water which is present in the gel and thus cause a poorer quality of alumina to be produced, with respect to catalyst properties.

The gelatinous precipitate can be dried and/or calcined before being activated with a suitable molybdenum containing compound. Alternatively, the molybdenum containing compound can be added directly to the wet gelatinous precipitate and the resultant mixture can be dried and calcined to produce the finished catalyst. Examples of methods of preparing the molybdenum oxide catalyst of this invention include the addition of ammonium molybdate to the gelatinous precipitate followed by a drying and calcination treatment. The gelatinous precipitate can be first dried and/or calcined and then ammonium molybdate solution is added thereto followed by drying and calcination treatments. In place of ammonium molybdate in the above described methods, a solution of alkali metal salts of molybdic acid or a solution of molybdic acid alone can be used to activate the gelatinous precipitate in the wet, dried and/or calcined state. Another method of preparing the molybdenum oxide catalyst involves combining the calcined gelatinous precipitate with molybdenum trioxide in the solid form and then subjecting the mixture to an elevated temperature sufficient to produce the finished catalyst. In this method, the elevated temperature employed is about 1100° to about 1600° F., preferably about 1200° to about 1450° F. The temperature treatment is conducted for a period of about 1 to about 15 hours, preferably about 2 to about 8 hours. The calcined gelatinous precipitate and the molybdenum trioxide in the solid form are preferably in the finely divided state. However, it should be understood that lump, pelleted and granular materials can be used for the preparation of this type of catalyst.

The drying operations mentioned above for the alumina gel and for the gelatinous precipitate are usually conducted at a temperature not greater than about 400° F., preferably about 150° to about 250° F. The drying period is about 6 to about 60 hours or higher, preferably about 20 to 40 hours. The drying treatment is employed to remove as much water from the catalytic component or mixture of catalyst components as is possible. Following the drying treatment, the material is subjected to a calcination operation in which the treatment is at least about 700° F. and it can be as high as about 1600° F., more usually about 1000° to 1450° F., preferably about 1000° to about 1450° F. The calcination treatment is conducted for a period of about 1 to about 15 hours, preferably about 2 to about 8 hours at the elevated temperatures described above. As a result of the calcination treatment, the catalytic components are converted to the active state. By maintaining the catalyst at an elevated temperature for an unduly long period of time, there is a danger of impairing catalytic activity. In some cases, it is desirable to perform the calcination and drying treatments as a single operation. To effect this purpose, a temperature of about 700° to about 1400° F. is employed. At this temperature, any water which is present in the material is flashed off and calcination subsequently occurs. In this type of an operation, the treatment occurs for a period of about 4 to about 20 hours, preferably about 6 to about 15 hours.

Quite unexpectedly, it was observed that a subsequent high temperature treatment of the finished catalyst results in a catalyst of higher activity and selectivity for reforming treatments of hydrocarbon oils. The high temperature treatment generally involves subjecting the finished catalyst to a temperature of about 1200° to about 1400° F. for a period of about 2 to about 10 hours, preferably about 3 to about 6 hours. The best results are obtained in the case of a finished catalyst which was calcined at a lower temperature than the temperatures employed in the so-called "after high temperature" treatment. In this respect, generally, the after treatment is at a temperature of about 50° to about 350° F. greater than the normal calcination treatment, preferably about 150° to about 250° F. greater. This result was not anticipated, because there was no reason to suspect that the catalyst activity and selectivity would improve an additional high temperature treatment.

Catalysts prepared according to the present invention possess numerous outstanding advantages and have a wide field of utility. In general, it appears that these contact materials are suitable for any reactions which are susceptible to catalysis with molybdenum oxide. They are useful in a variety of hydrocarbon conversion reactions, particularly those in which the hydrogen-carbon ratio is altered. Among the numerous reactions which lend themselves to catalysis by contact materials of the type disclosed herein are dehydrogenation, hydrogenation, hydrogenolysis, cracking, hydrocracking (i.e., cracking under hydrogen pressure), isomerization, hydrodesulfurization, oxidation, aromatization, cyclization, hydrocarbon synthesis, dealkylation, hydrodechlorination, dehydroxylation, alkylation, polymerization and hydrogen exchange systems. In general, these reactions may be carried out under the conventional reaction conditions of temperatures, pressure, etc., with the catalyst described herein. However, in many instances, the activity of the new contact materials permits the employment of less severe conditions, especially lower temperatures and contact time, without any sacrifice in yield and quality. A wide variety of organic compounds may be dehydrogenated including naphthenes, paraffins, alkyl radicals in aralkyl compounds, butenes, sterols, glycerides and many other organic compounds. By changing the reaction conditions in a known manner, these catalysts are also effective for hydrogenation of organic compounds in general, and especially fatty glycerides and olefins. They may also be employed in the hydrogenolysis of nitrobenzene to aniline and similar chemical changes. Another utilization lies in the dehydroxylation or demethylation, or both, of cresylic acid-type compounds. Among the substances which can be isomerized with these catalysts, paraffins and naphthenes are the most significant feeds from a commercial standpoint; but polyalkyl aromatics may be similarly treated, as exemplified in the catalytic transformation of o-xylene to p-xylene. In addition to the more common cracking reactions, the contact materials of the present invention are especially suitable for selective cracking in the presence of hydrogen as in the hydroforming process in which the feed is customarily a low octane naphtha. In hydroforming with the novel catalysts a substantial degree of sulfur removal occurs and the reaction may readily be shifted to favor hydrodesulfurization rather than reforming by changing the reaction conditions in a manner familiar to those skilled in the art. The synthesis of hydrocarbons from carbon monoxide and hydrogen in the presence of the new contact material is also contemplated. In the field of oxidative reactions, numerous changes can be effected with the present catalyst including the transformation of sulfur dioxide to sulfur trioxide, the formation of nitric acid and also of hydrazine from ammonia, the conversion of urea into hydrazine and the oxidation of hydrocarbons in general. An example of a catalytic dechlorination reaction of current importance, which may be catalyzed by the newly discovered agents, is that in which hydrogen converts trifluorotrichloroethane into trifluorochloroethylene and hydrogen chloride. The contact materials of the present invention are also suitable for the hydrogen exchange system as exemplified by the hydrogenation of coal with decalin and tetralin. By reason of their aromatizing and cyclizing characteristics they are outstanding in preparing benzene, toluene and the like in substantial yields from paraffins and naphthenes and also for the production of more highly cyclized compounds such as naphthalene, anthracene and alkyl substituted derivatives thereof under suitable conditions. In addition, polymerization and alkylation reactions are responsive to these catalysts; for example, the polymerization of olefins and the alkylation of aromatic compounds.

The present catalysts are especially useful for the reforming of naphthas into gasoline stocks of improved anti-knock characteristics. Many benefits result from reforming with the new catalysts in comparison with known reforming catalysts. In addition to being superior to all known similar types of reforming catalysts in activity and selectivity, superior flexibility and high selectivity have also been noted in comparison with other known reforming catalysts of a similar nature, especially in the higher octane ranges. Many economies in investment and operating costs are realized in reforming with the novel contact materials as a result of the smaller reactor, smaller separate regeneration vessel in a continuous system, longer on-stream period in a fixed bed system or lower regenerated catalyst replacement rate in a continuous system, and improved product selectivity.

In reforming naphtha or gasoline stocks with the catalyst disclosed herein, the conditions may be varied rather widely; thus temperatures of about 600° to about 1050° F. are suitable and the preferred range is from about 800° to about 950° F. Within these temperature limits weight space velocities of about 0.05 to about 10.0 pounds of naphtha per hour per pound of catalyst in the reaction zone may be employed advantageously; however, space velocities of about 0.25 to about 5.0 provide the best results. Hydrogen should be introduced into the reforming reactor at rates running from about 0.5 to about 20.0 mols of hydrogen per mol of hydrocarbon reactants. This hydrogen may be in admixture with light gaseous hydrocarbons. In fact, it is usually introduced by recycling hydrogen along with about 10–60% by volume of 1 to 3 carbon atom hydrocarbons, of the reforming reaction. The hydrogen serves an important function in maintaining the activity of the contact material by minimizing coke deposition thereon. While the total reaction pressure may be maintained at any value between about 50 and 1000 pounds per square inch gauge (p.s.i.g.), the best results are obtained by holding the reaction pressure within the range between about 100 and 750 p.s.i.g. Reaction conditions can be selected to provide either a hydroforming process, i.e., one in which there is a net production of hydrogen, or a reforming operation involving a net consumption of hydrogen. In a moving bed system, the relative rate of catalyst circulated to oil charge, on a weight basis, is generally about 0.01 to 10, preferably about 0.05 to 2.5.

In order to more fully understand the present invention, reference will be had to various specific examples. The catalyst prepared by means of the present invention is compared with a conventional catalyst in order to show superiority in activity. The preparations of these catalysts are described below.

CATALYST I

The alumina-silica sol was made by reacting the following materials: 1500 pounds of aluminum shot, approximately 7500 pounds of used aluminum shot and 100 pounds of mercury remaining in the tank from previous reactions, 3500 gallons of water, 7 pounds of mercuric oxide, 280 pounds of silicon tetrachloride, and 1460 pounds of 88% formic acid. The alumina-silica sol after centrifuging contained 13% solids and had a specific gravity of 1.150 at 100° F. Approximately 175 pounds of concentrated ammonium hydroxide was added to produce a thickening (gelation) of the sol (5 pH). This material was dried on a steam heated double drum dryer. The dried powder had an ignition loss of 57% and was calcined in a gas fired rotary drier at 1150° F., discharge temperature. The calcined powder was impregnated with ammonium molybdate solution by spraying the alumina in a Simpson mixer (edge runner) using 150 pounds per batch. The wet paste was placed on stainless clad-carbon steel trays and calcined for 6 hours at 1470° F. in a box type oil fired 8' x 10' hearth furnace. The product analyzed 9.27% $MoO_3$ and 2.90% $SiO_2$.

The powder was stored in fiber drums. A sample was removed and calcined 6 hours at 1470° F. in a laboratory furnace. After pelleting into 3/16" pills using 2% aluminum stearate as a lubricant the catalyst was recalcined 3.5 hours at 1200° F. to burn off the stearate. A test unit charge of 460 cc. weighed 475 grams. X-ray showed gamma-alumina. The finished catalyst contained 9% by weight of $MoO_3$.

CATALYST II 5210 grams of aluminum chloride ($AlCl_3 \cdot 6H_2O$) dissolved in 14 liters of water were stirred while adding thereto 4040 cc. of concentrated ammonium hydroxide (28–30% ammonia). A thick white gel was produced which required the addition of 4 liters of distilled water in order to provide a stirrable mass. The pH of the gel was 6.57 at 30° C. In order to increase the pH to approximately 7, 100 cc. of concentrated ammonium hydroxide were added. The resultant pH was 7.15 at 30° C. The gel was stirred for one hour and then filtered. The filtered gel was dried in a Despatch oven for 18 hours at 400° F. The dried gel was yellow-white in color.

The dried alumina was slurried in 14 liters of distilled water and the pH was found to be 3.89 at 19.5° C. 140 cc. of concentrated ammonium hydroxide were added to the slurry, thus increasing the pH to 6.82 at 24° C. The alumina slurry was stirred for ½ hour and then filtered. The gel was slightly pink in color. Two more washes similar to the one just described were made. The pH of the alumina slurry at the end of the second and third washes were 7.80 at 23° C. and 9.76 at 21° C., respectively. The fourth and fifth washes differed from the preceding ones only in that 100 cc. of ammonium hydroxide and 10 liters of distilled water were used. The pH at the end of the fourth and fifth washes were 9.62 at 22° C. and 9.66 at 22° C., respectively. As in the previous washes, the alumina was filtered after each washing operation. The washing procedures throughout this operation took approximately one working day involving approximately 7 hours and in the interim the washed alumina was permitted to stand overnight at atmospheric pressure. The sixth and seventh washes both involved the use of 120 cc. of concentrated ammonium hydroxide and 12 liters of distilled water. The slurries of alumina were both stirred for ½ hour prior to filtering. The pH of the alumina after the sixth and seventh washes were 9.81 at 21.5° C. and 9.92 at 24° C., respectively. At the end of the seventh wash, the alumina gel had converted to a gelatinous precipitate. Coincident with this conversion, the gel had lost its pink color. In the case of the eighth and ninth washes, the gelatinous precipitate was slurried in 12 liters of distilled water and 60 cc. of concentrated ammonium hydroxide. The pH of the gelatinous precipitate at the end of the eighth and ninth washes was 9.79 at 24.5° C. and 10.00 at 26° C., respectively. The gelatinous precipitate was washed two more times by employing 15 liters of water and 75 cc. of concentrated ammonium hydroxide. At the end of the tenth wash the pH was 10.06 at 26° C.; whereas at the end of the eleventh wash the pH was 10.00 at 23° C. The twelfth and final wash was performed by slurrying the gelatinous precipitate in 15 liters of water for one-half hour. The pH at the end of the twelfth wash was 9.56 at 23° C.

The washed gelatinous precipitate was slurried in 2 liters of distilled water and 30 cc. of glacial acetic acid which was diluted to a total of 60 cc. with water. An analysis by ignition loss showed the presence of 13.54% $Al_2O_3$. The slurry weighed 7369 grams and one-half of this amount was employed in the preparation of the finished catalyst. A solution of 20.5 cc. of glacial acetic acid diluted to 41 cc. by the addition of water was added to the one-half portion of alumina slurry and a molybdenum containing compound, prepared by dissolving 50 grams of $MoO_3$ (99% pure) in 40 cc. of concentrated ammonium hydroxide and 150 cc. of distilled water, was added to the alumina slurry. Upon the addition of the molybdenum containing compound, gelation occurred, thus an additional 2½ liters of water were added in order to provide a stirrable mass which was stirred for 15 minutes. The pH of the catalyst mass was 6.34 at 23° C. The catalyst mass was placed in a Despatch oven and dried for 65 hours at 220°–230° F. The dried catalyst was ground to a powder and then calcined for 3 hours at 1000° F. The calcined powder appeared slightly pink and weighed 562 grams. It was then pelleted into ⁵⁄₁₆″ pills, using 2% aluminum stearate as a lubricant. The pellets were calcined for an additional 3 hours at 1000° F. and they appeared white in color. The finished catalyst analyzed 8.95% $MoO_3$, 0.15% chloride ions and the remainder substantially all alumina.

CATALYST III

Catalyst II was additionally calcined for a three hour period at 1200° F.

The catalysts described above were tested in a laboratory unit for the purpose of evaluation. In these tests, a Midcontinent naphtha having an initial boiling point of 230° F. and and end point of 430° F. was used. This naphtha had an octane number (CFRR) of 29 and contained approximately 9% aromatics, by volume. The reactor of the test unit had a 550 cc. capacity. The catalysts in suitable quantities were charged to the reactor. Hydrogen was fed in a pure state at the rate indicated (s.c.f.b.) measured as standard cubic feet per barrel of oil feed, the volume of gas being measured at 60° F. and 760 mm. mercury. The regeneration of the catalyst was conducted by purging the same with hydrogen after it had become partially deactivated by the accumulation of carbonaceous deposits. The pressure of the system was released and the catalyst then purged with nitrogen. The catalyst was then heated to about 950° F. and air was introduced along with the nitrogen. The concentration of air was regulated to produce a maximum temperature at 1050° F. in the catalyst bed. During this operation, the temperature at various points in the bed was ascertained with two thermocouples, one located in the upper part and the other in the lower part of the bed. The flow of nitrogen and air through the bed was continued for about ½ hour, after the temperature dropped to about 950° F. Following another nitrogen purge, the system was again placed under hydrogen pressure for about 1 hour, while the hydrogen rate and temperature were being adjusted before feeding the naphtha again.

The results of this evaluation are given below in Table I.

*Table I*

| Run No | 1 | 2 | 3 | 4 | 5 | 6 | 7 | 8 |
|---|---|---|---|---|---|---|---|---|
| Catalyst | I | I | II | II | II | II | III | III |
| Operating conditions: | | | | | | | | |
| Temperature, °F | 898 | 899 | 900 | 900 | 901 | 898 | 900 | 905 |
| Pressure, p.s.i.g | 250 | 250 | 250 | 250 | 250 | 250 | 250 | 250 |
| Space velocity, $W_o/hr./W_c$ | 0.97 | 0.54 | 0.95 | 0.55 | 0.27 | 2.00 | 0.59 | 0.63 |
| Hydrogen, S.C.F.B | 4,941 | 4,238 | 4,874 | 4,069 | 4,555 | 4,882 | 5,080 | 5,258 |
| Catalyst charge, gms | 475 | 475 | 440 | 440 | 440 | 440 | 400 | 400 |
| Naphtha, gm./hr | 462 | 256 | 420 | 242 | 120 | 879 | 236 | 254 |
| Period of run, hrs | 8 | 8 | 8 | 8 | 8 | 8 | 8 | 8 |
| Yield (output basis): | | | | | | | | |
| Carbon, weight percent | | 0.171 | 0.140 | 0.183 | 0.595 | 0.005 | | 0.085 |
| Hydrogen, S.C.F.B | 520 | 633 | 275 | 461 | 49 | 388 | 336 | 676 |
| Dry gas, S.C.F.B | 750 | 943 | 716 | 1,015 | 128 | 666 | 871 | 1,351 |
| Total butanes, vol. percent | 4.4 | 4.9 | 8.7 | 8.8 | 11.4 | 4.6 | 8.8 | 10.1 |
| 100% $C_4$ gasoline, vol. percent [1] | 88.4 | 85.0 | 83.9 | 79.2 | 74.8 | 88.4 | 80.8 | 76.0 |
| 10# RVP gasoline, vol. percent [1] | 94.4 | 89.8 | 83.3 | 77.1 | 68.8 | 93.8 | 79.3 | 73.8 |
| Polymers, vol. percent [2] | 3.3 | 3.5 | 2.7 | 3.0 | 2.5 | 2.8 | 3.7 | 3.1 |
| Octane number CFRR: | | | | | | | | |
| 100% $C_4$ gasoline | 74.5 | 83.7 | 90.2 | 96.4 | 99.3 | 75.8 | 94.0 | 96.5 |
| 10# RVP gasoline | 76.1 | 84.6 | 90.0 | 96.3 | 99.2 | 77.2 | 93.9 | 96.4 |
| Space velocity to obtain 85 CFRR $C_4$ free gasoline | 0.54 | 0.54 | 1.26 | 1.26 | 1.26 | 1.26 | 1.51 | 1.51 |
| $C_4$ free liquid @ 85 CFRR, vol. percent | | | 80.8 | 80.8 | 80.8 | 80.8 | 81.4 | 81.4 |

[1] 400° F. E.P. gasoline.
[2] Boils above gasoline.

From Table I above, it is to be noted that by comparison of Catalyst II with Catalyst I that the activity is substantially greater in the case of the catalyst of the present invention. This is clearly shown by reference to the space velocity which is required to obtain a $C_4$ free gasoline of 85 octane number (CFRR). By comparison of Catalyst III and Catalyst II, it is to be noted that the activity and selectivity of the catalyst substantially improved by an after treatment at an elevated temperature, i.e., 1200° F., for a three hour period. The selectivity is indicated by the volume of $C_4$ free liquid having an 85 octane number CFRR which can be produced. The improvement in selectivity and activity which is effected by an after treatment at an elevated temperature was not anticipated, because generally, it is noted in such cases that there might be an increase in activity with an accompanying decrease in selectivity. Normally, subjecting the catalyst to a temperature higher than what is generally employed in the calcination treatment serves to give some indication, on an accelerated basis, of the stability of the catalyst at elevated temperatures. This property is important because any catalyst in commercial operation for an extended period of time may undergo a significant loss of activity and selectivity which was not foreseen on the basis of the tests made. Hence, by subjecting the catalyst in the laboratory to an elevated temperature which is greater than that employed in the calcination treatment, some indication may be obtained as to the stability of the catalyst. On the basis of the comparison between Catalysts II and III, it appears that the catalyst of the present invention may improve with use rather than undergo any decrease in catalytic properties.

Having thus provided a description of the present invention by furnishing specific examples thereto, it should be understood that no undue limitations and restrictions are to be imposed by reason thereof, but that the scope of our invention is defined by the appended claims.

We claim:

1. A catalyst comprising an oxide of molybdenum on alumina, which alumina is prepared by precipitating alumina gel by reacting an alkaline reagent with an aluminum salt, drying said get at an elevated temperature, and then reconstituting the gel by reslurrying in an aqueous medium, treating the reconstituted alumina gel with an alkaline reagent for a period of time sufficient to convert the same to a gelatinous precipitate and subjecting the gelatinous precipitate to a calcination treatment to convert the same to the desired support material.

2. The catalyst of claim 1 wherein the alkaline reagent is ammonium hydroxide.

3. The catalyst of claim 1 wherein said aluminum salt is an aluminum salt of a strong acid.

4. The catalyst of claim 1 wherein the aluminum salt is aluminum chloride.

5. A catalyst comprising an oxide of molybdenum on alumina, which catalyst is prepared by precipitating alumina gel by reacting an aluminum salt with an alkaline reagent, drying said gel at an elevated temperature not higher than 400° F. and then reconstituting the gel by reslurrying in an aqueous medium, treating the reconstituted gel with an alkaline reagent for a period sufficient to convert the same to a gelatinous precipitate, combining the gelatinous precipitate with ammonium moylbdate, and then subjecting the resultant mixture to a calcination treatment to convert the same to the desired catalyst.

6. A catalyst comprising an oxide of molybdenum on alumina, which catalyst is prepared by precipitating alumina gel by the reaction of an aluminum salt with an alkaline reagent, drying said gel at a temperature between about 150° F. and about 400° F. and then reconstituting the gel by reslurrying in an aqueous medium, treating the reconstituted gel with an alkaline reagent for a period sufficient to convert the same to a gelatinous precipitate, combining the gelatinous precipitate with a molybdenum oxide forming substance, subjecting the resultant mixture to an elevated temperature to convert the mixture to molybdenum oxide on alumina, and then subjecting the molybdenum oxide on alumina catalyst to a further treatment at a temperature of about 1200° to about 1400° F.

7. A catalyst comprising an oxide of molybdenum on alumina, which catalyst is prepared by precipitating alumina gel by the reaction of an aluminum salt with an alkaline reagent, drying said gel at a temperature about 150° F. and about 400° F. and then reconstituting the gel by reslurrying in an aqueous medium, treating the reconstituted gel with an alkaline reagent for a period sufficient to convert the same to a gelatinous precipitate, combining the gelatinous precipitate with a molybdenum oxide forming substance, subjecting the resultant mixture to a calcination treatment to obtain molybdenum oxide on alumina, and then subjecting the catalyst thus produced to an after treatment at a temperature of about 150° to about 250° greater than was used in the previous high temperature treatment.

8. A catalyst comprising molybdenum trioxide on alumina, which catalyst is prepared by precipitating alumina gel by the reaction of aluminum chloride with ammonium hydroxide, drying said gel at a temperature of between about 150° F. and about 400° F. and then reconstituting the gel by reslurrying in an aqueous medium, treating the reconstituted alumina gel with ammonium hydroxide for a period sufficient to convert same to a gelatinous precipitate, combining the gelatinous precipitate with ammonium molybdate, and then subjecting the resultant mixture to an elevated temperature in the order of about 1000° to about 1450° F. to convert the same to the desired catalyst.

9. A method of producing a molybdenum oxide catalyst which comprises preparing alumina gel from the reaction of an aluminum salt with an alkaline reagent, drying said gel at a temperature of between about 150° F. and about 400° F., and then reconstituting the gel by reslurrying in an aqueous medium, treating the reconstituted alumina gel with an alkaline reagent for a period sufficient to convert the same to a gelatinous precipitate, combining the gelatinous precipitate with a molybdenum oxide forming substance, and then subjecting the catalyst mixture to a calcination treatment sufficient to convert the same to the desired catalyst.

10. The method of claim 9 wherein the aluminum salt is derived from a strong acid.

11. A method for preparing molybdenum trioxide on alumina which comprises precipitating alumina gel by reacting aluminum chloride with ammonium hydroxide, drying said gel at a temperature of between about 150° F. and about 400° F. for a period of time between about 6 and about 60 hours, and then reconstituting the gel by reslurrying in an aqueous medium, treating the reconstituted alumina gel with ammonium hydroxide for a period sufficient to convert the same to a gelatinous precipitate, combining the gelatinous precipitate with ammonium molybdate, and then subjecting the resultant mixture to a calcination treatment sufficient to convert the same to the desired catalyst.

12. A method which comprises precipitating alumina gel by the reaction of an aluminum salt with an alkaline reagent, drying said gel at a temperature between about 150° F. and about 400° F. and then reconstituting the gel by reslurrying in an aqueous medium, treating the reconstituted gel with an alkaline reagent for a period sufficient to convert the same to a gelatinous precipitate, combining the gelatinous precipitate with a molybdenum oxide forming substance, subjecting the resultant mixture to a calcination treatment to obtain molybdenum oxide on alumina, and then subjecting the catalyst thus produced to an after treatment at an elevated temperature of about 1200° to about 1400° F., said temperature of after treatment being about 150° to about 250° greater than the initial treatment at an elevated temperature.

13. A process for converting hydrocarbons which comprises contacting a hydrocarbon material under suitable conversion conditions with a catalyst comprising molybdenum oxide on alumina, which alumina is prepared by precipitating alumina gel by the reaction of an alkaline reagent with an aluminum salt, drying said gel at an elevated temperature not higher than about 400° F. and then reconstituting the gel by reslurrying in an aqueous medium, then treating the reconstituted alumina gel with an alkaline reagent for a period of time sufficient to convert the same to a gelatinous precipitate and subjecting the gelatinous precipitate to a calcination treatment to convert the same to the desired support material.

14. A reforming process which comprises contacting a naphtha fraction under suitable reforming conditions with a catalyst comprising molybdenum oxide on alumina, which alumina is prepared by precipitating alumina gel by the reaction of an alkaline reagent with an aluminum salt, drying said gel at a temperature between about 150° F. and about 400° F. and then reconstituting the gel by reslurrying in an aqueous medium, then treating the reconstituted alumina gel with an alkaline reagent for a period of time sufficient to convert the same to a gelatinous precipitate and subjecting the gelatinous precipitate to a calcination treatment to convert the same to the desired support material.

15. A hydroforming process which comprises contacting a naphtha fraction under suitable hydroforming conditions with a catalyst comprising molybdenum oxide on alumina, which catalyst is prepared by precipitating alumina gel by the reaction of aluminum chloride with ammonium hydroxide, drying said gel at a temperature between about 150° F. and about 400° F. and then reconstituting the gel by reslurrying in an aqueous medium, treating the reconstituted gel with ammonium hydroxide for a period sufficient to convert the same to a gelatinous precipitate, combining the gelatinous precipitate with a molybdenum oxide forming substance, and then subjecting the resultant mixture to a temperature in the order of about 1000° to about 1450° F. for a period sufficient to obtain the desired catalyst.

16. The process of claim 15 wherein the molybdenum oxide froming substance is ammonium molybdate.

17. A hydroforming process which comprises contacting a naphtha fraction under suitable hydroforming conditions with a catalyst comprising molybdenum oxide on alumina, which catalyst is prepared by precipitating alumina gel by the reaction of aluminum chloride with ammonium hydroxide, drying said gel at a temperature between about 150° F. and about 400° F., and then reconstituting the gel by reslurrying in an aqueous medium, treating the reconstituted gel with ammonium hydroxide for a period sufficient to convert the same to a gelatinous precipitate, combining the gelatinous precipitate with ammonium molybdate, subjecting the resultant mixture to a calcination treatment and for a period sufficient to obtain molybdenum oxide on alumina, and then subjecting the molybdenum oxide on alumina catalyst thus produced to a temperature of about 1200° to about 1400° F., such after treatment at an elevated temperature being about 150° to about 250° greater than the temperature at which ammonium molybdate is converted to molybdenum oxide.

References Cited in the file of this patent

UNITED STATES PATENTS

| | | |
|---|---|---|
| 2,463,072 | Webb et al. | Mar. 1, 1949 |
| 2,663,620 | Haensel | Dec. 22, 1953 |